(12) United States Patent
Kowalczyk et al.

(10) Patent No.: US 8,412,017 B2
(45) Date of Patent: Apr. 2, 2013

(54) CABLE PULLING ASSEMBLY

(75) Inventors: Scott C. Kowalczyk, Savage, MN (US); Jonathan Walter Coan, Savage, MN (US); Jonathan R. Kaml, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 175 days.

(21) Appl. No.: 12/779,198

(22) Filed: May 13, 2010

(65) Prior Publication Data

US 2010/0316347 A1 Dec. 16, 2010

Related U.S. Application Data

(60) Provisional application No. 61/177,879, filed on May 13, 2009.

(51) Int. Cl.
*G02B 6/00* (2006.01)
*G02B 6/36* (2006.01)

(52) U.S. Cl. .......................................... 385/136; 385/92

(58) Field of Classification Search .................. 385/136, 385/92
See application file for complete search history.

(56) References Cited

U.S. PATENT DOCUMENTS

| | | |
|---|---|---|
| 2,231,919 A | 2/1941 | Kent |
| 3,672,006 A | 6/1972 | Fidrych |
| 3,858,848 A | 1/1975 | MacFetrich |
| 3,906,619 A | 9/1975 | Shaffer |
| 4,368,910 A | 1/1983 | Fidrych |
| 4,453,291 A | 6/1984 | Fidrych |
| 4,460,159 A | 7/1984 | Charlebois et al. |
| 4,684,161 A | 8/1987 | Egner et al. |
| 4,684,211 A | 8/1987 | Weber et al. |
| 4,736,978 A | 4/1988 | Cielker |
| 5,013,125 A | 5/1991 | Nilsson et al. |
| 5,039,196 A | 8/1991 | Nilsson |
| 5,067,843 A | 11/1991 | Nova |
| 5,122,007 A | 6/1992 | Smith |
| 5,133,583 A | 7/1992 | Wagman et al. |
| 5,245,730 A | 9/1993 | Martin |
| 5,283,930 A | 2/1994 | Krauss |
| 5,308,026 A | 5/1994 | Shaw |
| 5,480,203 A | 1/1996 | Favalora et al. |
| 5,863,083 A | 1/1999 | Giebel et al. |
| 5,938,180 A | 8/1999 | Walsten |
| 6,266,469 B1 * | 7/2001 | Roth .............................. 385/136 |
| 6,396,993 B1 | 5/2002 | Giebel et al. |
| 6,398,422 B1 | 6/2002 | Szilagyi et al. |
| 6,719,274 B2 | 4/2004 | Bowling |
| 6,993,237 B2 | 1/2006 | Cooke et al. |

(Continued)

FOREIGN PATENT DOCUMENTS

DE 42 00 865 A1 7/1993
WO WO 2005/072395 A2 8/2005

*Primary Examiner* — K. Cyrus Kianni
(74) *Attorney, Agent, or Firm* — Merchant & Gould P.C.

(57) ABSTRACT

A cable pulling assembly includes an enclosure that is adapted for enclosing a connector of a fiber optic cable. The enclosure includes a body having a base portion and a cover portion. The base portion includes a first axial end and a second axial end and defines a first connector cavity. The first connector cavity is adapted to receive a portion of the connector of the fiber optic cable. The cover portion includes a first axial end and an oppositely disposed second axial end. The second axial end is engaged to the second axial end of the base portion at a hinge. The cover portion defines a second connector cavity that is adapted to receive a remaining portion of the connector. The enclosure defines a hole that extends through the base and cover portions. The hole is adapted to receive a pulling member.

28 Claims, 6 Drawing Sheets

U.S. PATENT DOCUMENTS

| | | |
|---|---|---|
| 7,228,047 B1 * | 6/2007 | Szilagyi et al. ............... 385/134 |
| 7,246,789 B2 | 7/2007 | Ames et al. |
| 7,397,997 B2 * | 7/2008 | Ferris et al. ................... 385/135 |
| 7,480,437 B2 * | 1/2009 | Ferris et al. ................... 385/135 |
| 8,126,307 B2 * | 2/2012 | Hovland et al. ............... 385/139 |
| 2006/0133748 A1 | 6/2006 | Seddon et al. |
| 2008/0260344 A1 * | 10/2008 | Smith et al. ................... 385/135 |
| 2009/0238534 A1 | 9/2009 | Ahmed |
| 2010/0052346 A1 * | 3/2010 | Cooke et al. ................. 294/86.4 |
| 2011/0044599 A1 * | 2/2011 | Kowalczyk et al. .......... 385/135 |

* cited by examiner

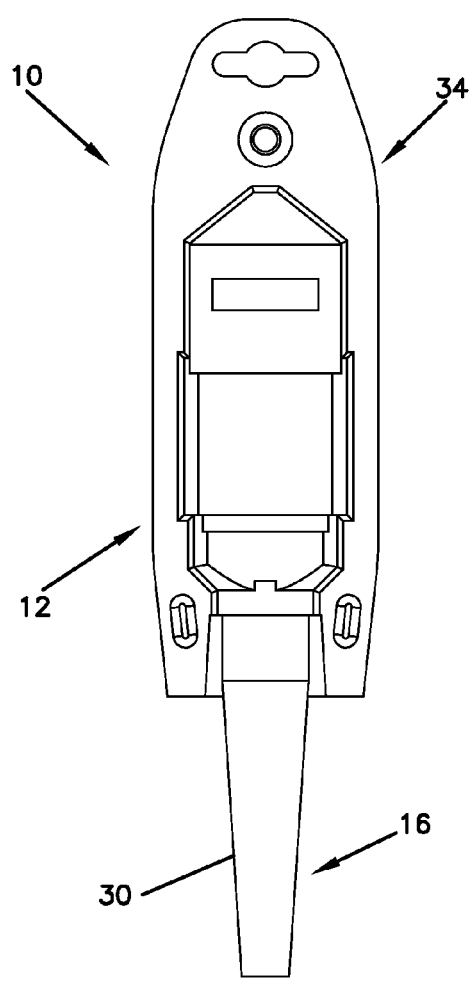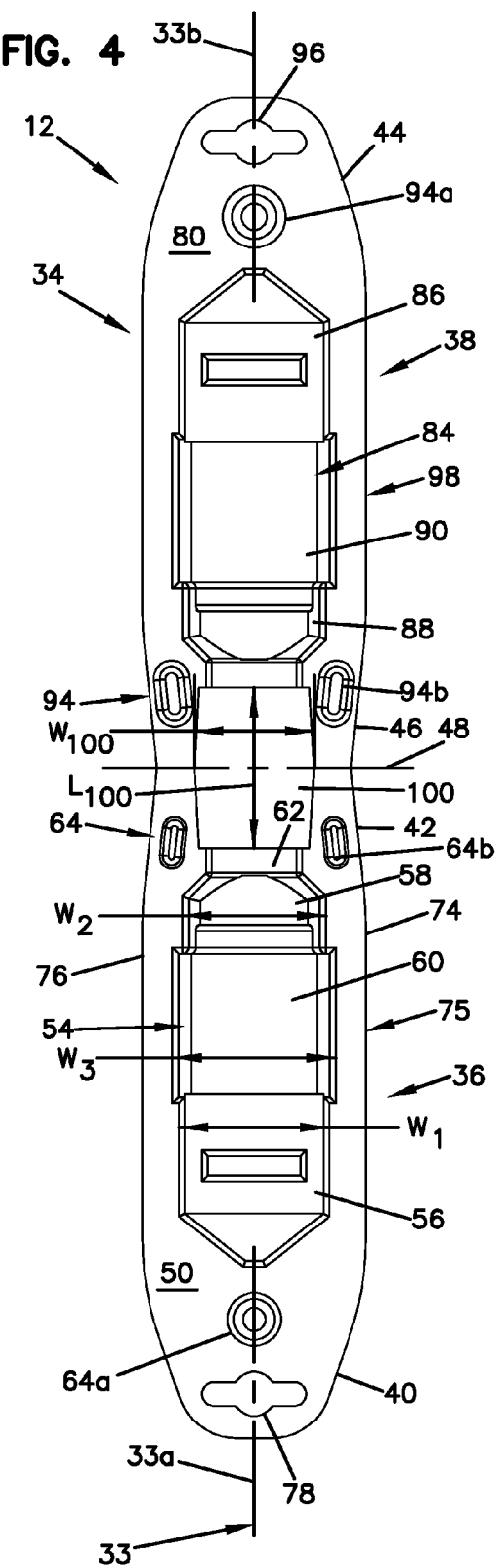

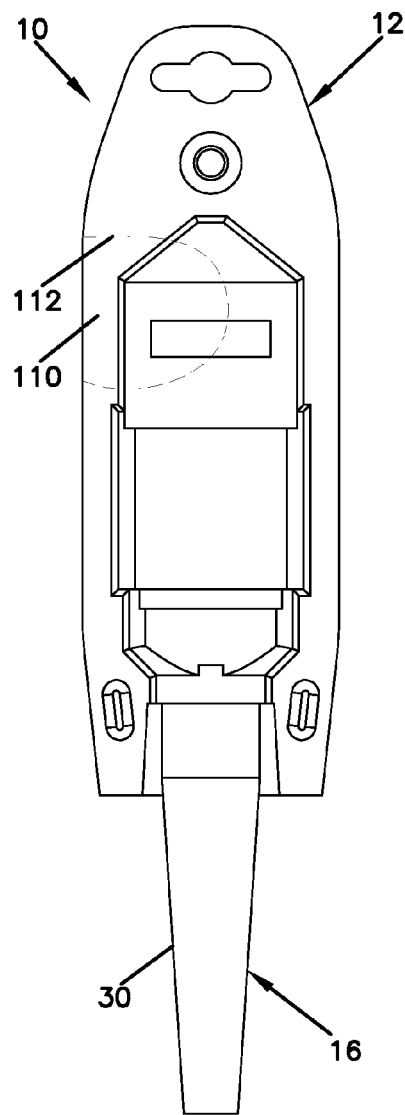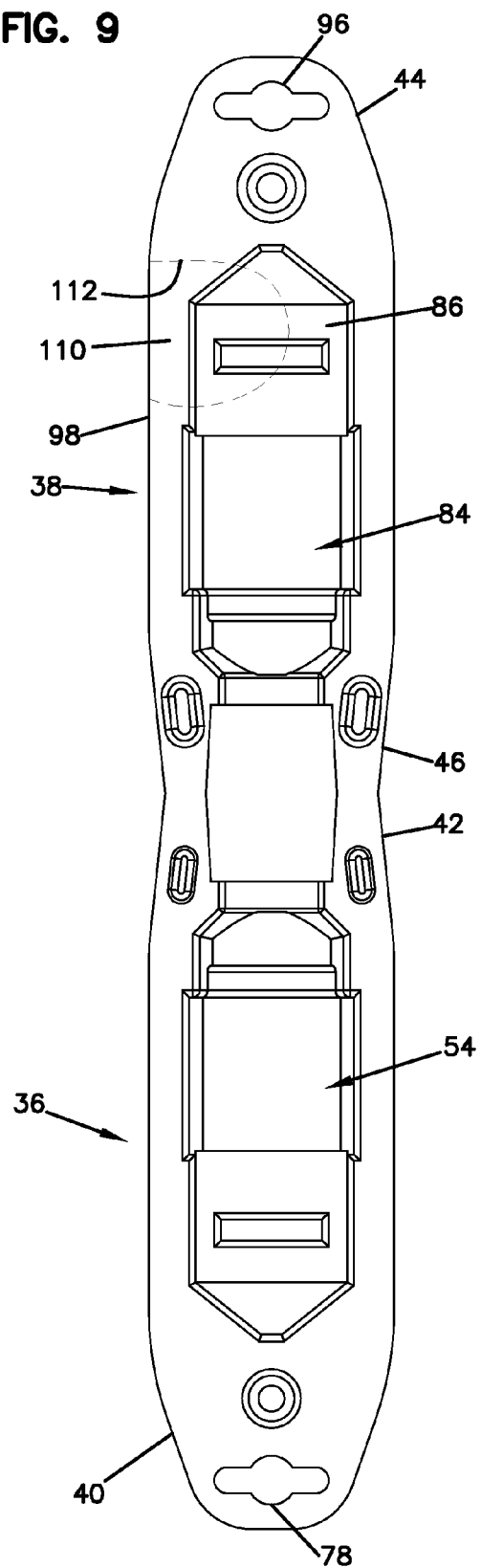

CABLE PULLING ASSEMBLY

CROSS REFERENCE TO RELATED APPLICATIONS

The present application claims priority to U.S. Provisional Patent Application Ser. No. 61/177,879, entitled CABLE PULLING ASSEMBLY and filed on May 13, 2009, the disclosure of which is hereby incorporated by reference in its entirety.

BACKGROUND

As demand for telecommunications increases, optical fiber services are being extended in more and more areas. In order for a residence or business to access these optical fiber services, fiber optic cables must be installed in these residences and businesses. In some cases, the fiber optic cables are installed in existing structures. In other cases, these fiber optic cables are installed in new constructions.

In either case, however, fiber optic cables are usually routed through enclosed spaces, such as between support structures disposed inside walls. In order to get the fiber optic cable through these enclosed spaces, cable pullers can be used. However, cable pullers are not always preferred since the size of cable pullers can prevent the cable from being pulled through small enclosed spaces.

SUMMARY

An aspect of the present disclosure relates to a cable pulling assembly. The cable pulling assembly includes an enclosure that is adapted for enclosing a connector of a fiber optic cable. The enclosure includes a body having a base portion and a cover portion. The base portion includes a first axial end and an oppositely disposed second axial end and defines a first connector cavity. The first connector cavity is adapted to receive a portion of the connector of the fiber optic cable. The cover portion includes a first axial end and an oppositely disposed second axial end. The second axial end is engaged to the second axial end of the base portion at a hinge. The cover portion defines a second connector cavity that is adapted to receive a remaining portion of the connector when the enclosure is in a closed position. The enclosure defines a hole that extends through the base and cover portions. The hole is adapted to receive a pulling member.

Another aspect of the present disclosure relates to a cable pulling assembly. The cable pulling assembly includes an enclosure that is adapted for enclosing a connector of a fiber optic cable. The enclosure defines a central longitudinal axis and includes a body having a base portion and a cover portion. The base portion includes a first axial end and an oppositely disposed second axial end and defines a first connector cavity. The first connector cavity is adapted to receive a portion of the connector of the fiber optic cable. The cover portion includes a first axial end and an oppositely disposed second axial end. The second axial end is engaged to the second axial end of the base portion at a living hinge that is generally perpendicular to the central longitudinal axis of the enclosure. The cover portion defines a second connector cavity that is adapted to receive a remaining portion of the connector when the enclosure is in a closed position. The enclosure defines a hole that extends through the base and cover portions. The hole is adapted to receive a pulling member.

Another aspect of the present disclosure relates to a cable pulling assembly. The cable pulling assembly includes a blister pack enclosure that is adapted for enclosing a connector of a fiber optic cable. The blister pack enclosure is moveable between an open position and a closed position. The blister pack enclosure defines a central longitudinal axis and includes a body having a base portion and a cover portion. The base portion includes a first axial end and an oppositely disposed second axial end and defines a first connector cavity. The first connector cavity is adapted to receive a portion of the connector of the fiber optic cable. The base portion includes a first surface and an oppositely disposed second surface. The first surface defines an opening to the first connector cavity. The cover portion includes a first axial end and an oppositely disposed second axial end. The second axial end is engaged to the second axial end of the base portion at a living hinge that is generally perpendicular to the central longitudinal axis of the enclosure. The cover portion defines a second connector cavity that is adapted to receive a remaining portion of the connector when the enclosure is in a closed position. The cover portion includes a first face and an oppositely disposed second face. The first face defines an opening to the second connector cavity. The blister pack enclosure defines a hole that extends through the first axial ends of the base and cover portions. The hole is adapted to receive a pulling member. The second axial ends of the base and cover portions defining a connector opening.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 3 is a top view of the cable pulling assembly of FIG. 1.

FIG. 4 is a top view of an enclosure of the cable pulling assembly shown in the open position.

FIG. 8 is a top view of an alternate embodiment of the cable pulling assembly of FIG. 1.

FIG. 9 is a top view of an alternate embodiment of the enclosure of FIG. 4.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
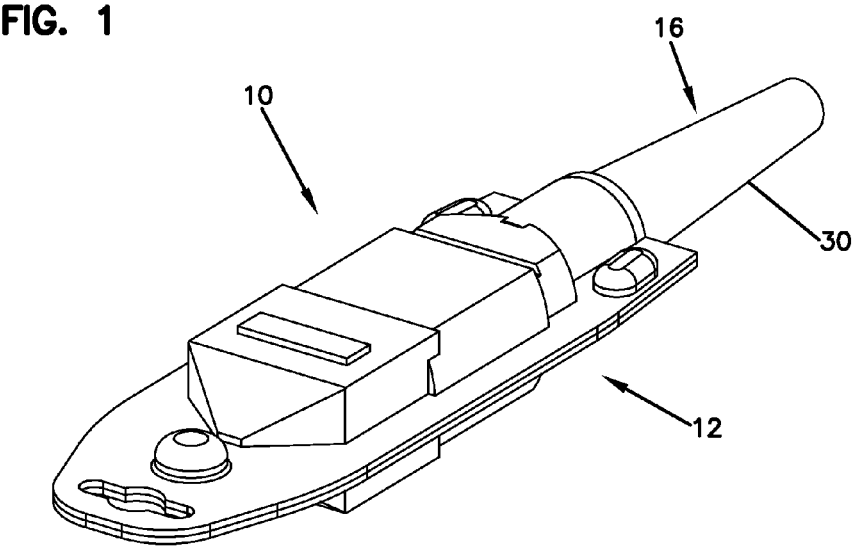
FIG. 1 is a perspective view of a cable pulling assembly having exemplary features of aspects in accordance with the principles of the present disclosure.
Figure 2:
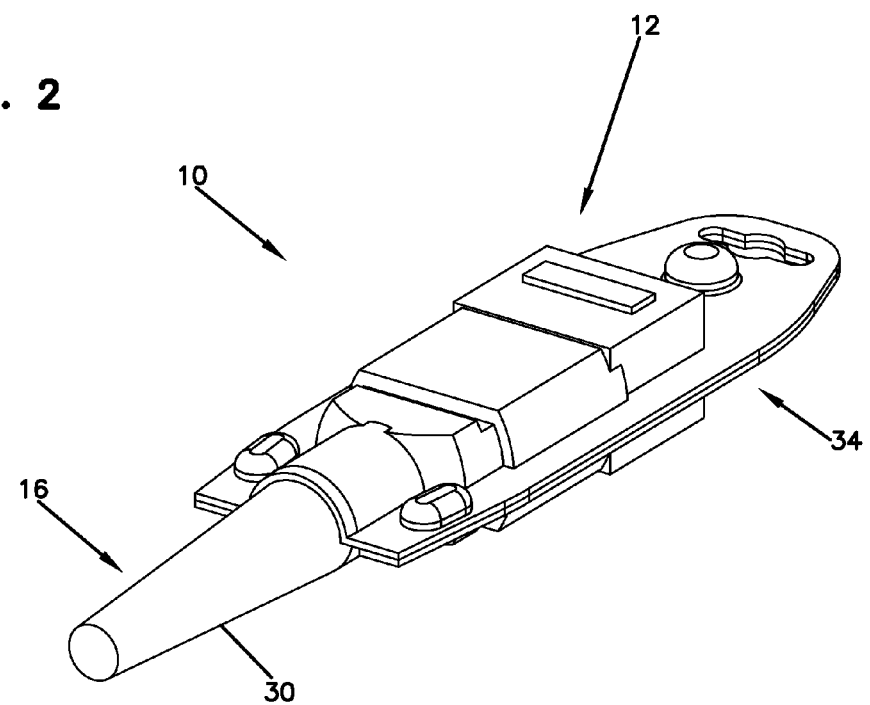
FIG. 2 is an alternate perspective view of the cable pulling assembly of FIG. 1.

Referring now to FIGS. 1-3 and 7, a cable pulling assembly, generally designated 10, is shown. The cable pulling assembly 10 includes an enclosure 12. In FIGS. 1-3, the enclosure 12 is shown in a closed position. In the closed position, the enclosure 12 is adapted to enclose a connectorized end 14 (shown in FIG. 7) of a fiber optic cable 16.

The connectorized end 14 of the fiber optic cable 16 includes a connector 18. In one aspect of the present disclosure, the connector 18 is a multi-fiber connector. In another aspect of the present disclosure, the connector 18 is a single fiber connector. The connector 18 is engaged to the fiber optic cable 16. In one aspect of the present disclosure, the fiber optic cable 16 includes a strength layer 20 that surrounds an optical fiber 22. In one aspect of the present disclosure, the connector 18 is crimped to the strength layer 20. This engagement of the connector 18 to the strength layer 20 allows axial force applied to the connector 18 to be applied to the strength layer 20.

The strength layer 20 is adapted to inhibit axial tensile loading from being applied to the optical fiber 22. In certain embodiments, the strength layer 20 can include yarns, fibers, threads, tapes, films, epoxies, filaments or other structures. In a preferred embodiment, the strength layer 20 includes aramid yarns (e.g., KEVLAR® yarns). An outer jacket 24 is disposed around the strength layer 20.

The connectorized end 14 of the fiber optic cable 16 further includes a dust cap 26 disposed over a first axial end 28 of the connector 18. A strain relief boot 30 is disposed at a second axial end 32 of the connector 18.

Figure 5:
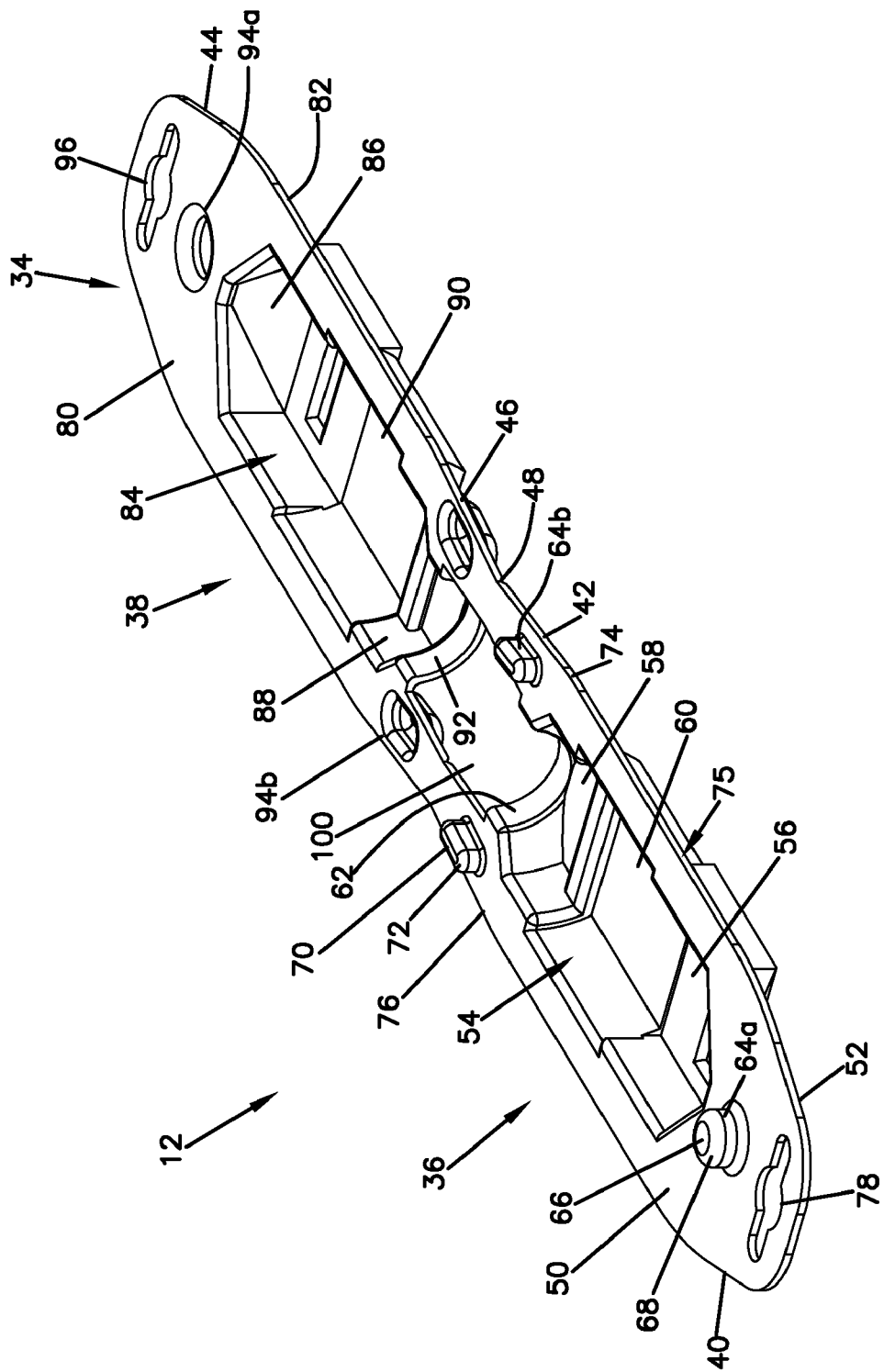
FIG. 5 is a perspective view of the enclosure of FIG. 4.
Figure 6:
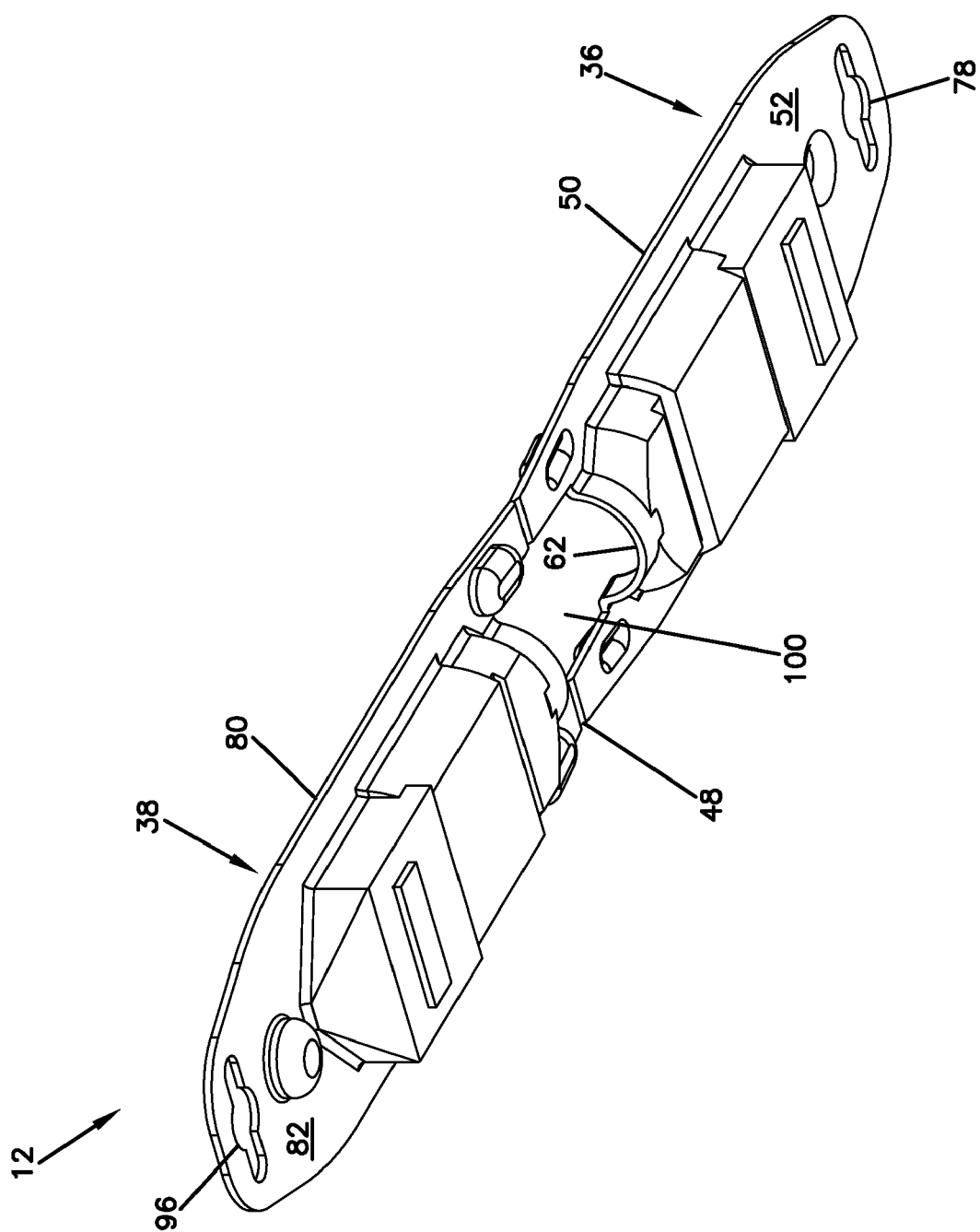
FIG. 6 is an alternate perspective view of the enclosure of FIG. 4.
Figure 7:
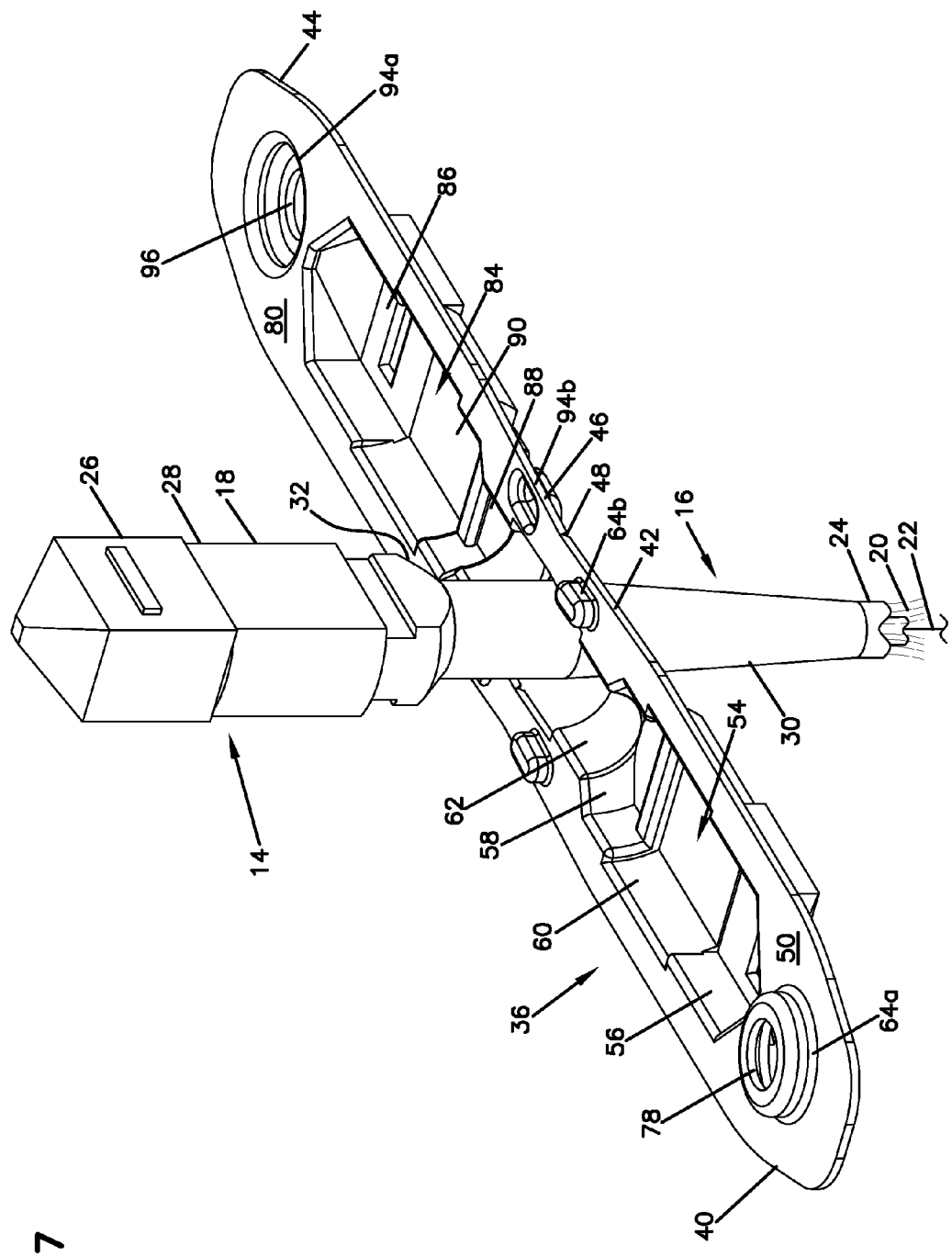
FIG. 7 is a perspective view of a connectorized end being inserted into the enclosure of FIG. 4.

Referring now to FIGS. 4-6, the enclosure 12 is shown in an open position. The enclosure 12 is a clamshell (e.g., blister pack) enclosure and defines a central longitudinal axis 33. The enclosure 12 includes a body 34 having a base portion 36 and a cover portion 38. In one aspect of the present disclosure, the enclosure 12 is disposable after use. As such, the enclosure 12 can be manufactured from a plastic material, such as polypropylene, polyethylene, high-density polyethylene, etc. In one aspect of the present disclosure, the material of the enclosure 12 has a thickness that is less than or equal to about 0.030 inches. In another aspect of the present disclosure, the material of the enclosure 12 has a thickness that is in the range of about 0.015 inches to about 0.035 inches.

The base portion 36 includes a first axial end 40 and an oppositely disposed second axial end 42 disposed along a first longitudinal axis 33a. The cover portion 38 includes a first axial end 44 and an oppositely disposed second axial end 46 disposed along a second longitudinal axis 33b. In one aspect of the present disclosure, the base and cover portions 36, 38 are hinged at the second axial ends 42, 46 of the base and cover portions 36, 38, respectively.

In another aspect of the present disclosure, the base and cover portions 36, 38 are integrally connected at the second axial ends 42, 46. A living hinge 48 separates the second axial end 42 of the base portion 36 from the second axial end 46 of the cover portion 38. In one aspect of the present disclosure, the living hinge 48 is an area of material having a reduced thickness. In another aspect of the present disclosure, the living hinge 48 is perforated. In the depicted embodiment, the living hinge 48 is generally perpendicular to a longitudinal axis of the enclosure 12.

The base portion 36 of the enclosure 12 includes a first surface 50 and an oppositely disposed second surface 52. The base portion 36 of the enclosure 12 defines a first connector cavity 54. The first surface 50 of the base portion 36 defines an opening to the first connector cavity 54. The first connector cavity 54 is adapted to receive a portion of the connectorized end 14 of the fiber optic cable 16. In one aspect of the present disclosure, the first connector cavity 54 is adapted to receive half of the connectorized end 14 of the fiber optic cable 16.

The first connector cavity 54 includes a first end portion 56 disposed adjacent to the first axial end 40 of the base portion 36, a second end portion 58 disposed adjacent to the second end 42 of the base portion 36 and a center portion 60 disposed between the first and second end portions 56, 58. In one aspect of the present disclosure, the first end portion 56 of the first connector cavity 54 has a width $W_1$ while the second end portion 58 and the center portion 60 have widths $W_2$ and $W_3$, respectively. In one aspect of the present disclosure, the width $W_3$ of the center portion 60 is greater than the widths $W_1$, $W_2$ of the first and second end portions 56, 58. In another aspect of the present disclosure, the width $W_1$ of the first end portion 56 is greater than the width $W_2$ of the second end portion 58.

The first end portion 56 of the first connector cavity 54 is adapted to receive a portion of the dust cap 26 disposed over the first axial end 28 of the connector 18. The second end portion 58 and the center portion 60 are adapted to receive a portion of the connector 18.

In one aspect of the present disclosure, the first connector cavity 54 is formed by a conventional vacuum forming process. As the first connector cavity 54 is formed by a conventional vacuum forming process, the width $W_1$ of the first end portion 56 is less than or equal to the width of the dust cap 26 of the connectorized end 14 of the fiber optic cable 16 while the widths $W_2$, $W_3$ of the second end portion 58 and the center portion 60 are less than or equal to the width of the connector 18. In one aspect of the present disclosure, there is an interference fit between the first connector cavity 54 and the connectorized end 14 of the fiber optic cable 16.

The second axial end 42 of the base portion 36 defines a first channel 62. The first channel 62 extends from the second end portion 58 of the first connector cavity 54 through the second axial end 42 of the base portion 36 of the body 34. In one aspect of the present disclosure, the first channel 62 is semi-cylindrical in shape. The first channel 62 is adapted to receive a portion of the fiber optic cable 16. In one aspect of the present disclosure, the first channel 62 is adapted to receive a portion of the strain relief boot 30.

The base portion 36 includes a projection 64 that extends outwardly from the first surface 50. In one aspect of the present disclosure, the base portion 36 includes a plurality of projections 64. A first projection 64a is disposed at the first axial end 40 of the base portion 36 while a plurality of second projections 64b is disposed at the second axial end 42.

The first projection 64a is generally cylindrical in shape. The first projection 64a includes an end 66 having an edge 68 that is tapered. In one aspect of the present disclosure, the edge 68 is rounded.

Each of the plurality of second projections 64b is generally oblong in shape and includes an end 70 having an edge 72 that is tapered. In one aspect of the present disclosure, the edge 72 is rounded. One of the plurality of second projections 64b is disposed between a first edge 74 of a perimeter 75 of the first surface 50 and the first connector cavity 54 while another of the plurality of second projections 64b is disposed between a second edge 76 of the perimeter 75 of the first surface 50 and the first connector cavity 54 such that the first connector cavity 54 is disposed between the plurality of second projections 64b.

The base portion 36 of the enclosure 12 further includes a first hole 78. The first hole 78 is disposed at the first axial end 40 of the base portion 36 between the first projection 64a and the perimeter 75. In the depicted embodiment of FIG. 7, the first hole 78 of the base portion 36 is disposed at the first axial end 40 such that the first hole 78 extends through the first projection 64a. The first hole 78 extends through the first and second surfaces 50, 52. The first hole 78 is adapted to receive a pulling member (e.g., rope, chain, etc.) for pulling the cable pulling assembly 10 through a passage or to receive a hanging member (e.g., nail, hook, etc.) for storing the cable pulling assembly 10 at a location prior to connecting the connectorized end 14 of the fiber optic cable 16 to a fiber optic connection.

Referring still to FIGS. 4-6, the cover portion 38 of the enclosure 12 includes a first face 80 and an oppositely disposed second face 82. The cover portion 38 defines a second connector cavity 84. The second connector cavity 84 is adapted to receive the remaining portion of the connectorized end 14 of the fiber optic cable 16 that extends outwardly from the first connector cavity 54. In one aspect of the present disclosure, the second connector cavity 84 is adapted to receive the remaining half of the connectorized end 14 of the fiber optic cable 16. The first face 80 of the cover portion 38 defines an opening to the second connector cavity 84.

The second connector cavity 84 includes a first axial end portion 86 disposed adjacent to the first axial end 44 of the cover portion 38, a second axial end portion 88 disposed adjacent to the second axial end 46 of the cover portion 38 and a center portion 90 disposed between the first and second axial end portions 86, 88. The first axial end portion 86 of the second connector cavity 84 is adapted to receive the remaining portion of the dust cap 26 while the second axial end portion 88 and the center portion 90 are adapted to receive the remaining portion of the connector 18.

In one aspect of the present disclosure, the second connector cavity 84 is formed by a conventional vacuum forming process. As the second connector cavity 84 is formed by a conventional vacuum forming process, the second connector cavity 84 is adapted to be in a tight fit with the connectorized end 14 of the fiber optic cable 16. In one aspect of the present disclosure, the second connector cavity 84 is adapted to be in an interference fit with the connectorized end 14 of the fiber optic cable 16.

The second axial end 46 of the cover portion 38 defines a second channel 92. The second channel 92 extends from the second axial end portion 88 of the second connector cavity 84 through the second axial end 46 of the cover portion 38 of the body 34. In one aspect of the present disclosure, the second channel 92 is semi-cylindrical in shape and adapted to receive the remaining portion of the fiber optic cable 16. In one aspect of the present disclosure, the second channel 92 is adapted to receive the remaining portion of the strain relief boot 30.

The first face 80 of the cover portion 38 defines a recess 94. In one aspect of the present disclosure, the first face 80 of the cover portion 38 defines a plurality of recesses 94. A first recess 94a is disposed at the first axial end 44 of the cover portion 38 while a plurality of second recesses 94b is disposed at the second axial end 46.

The first recess 94a is generally cylindrical in shape while each of the plurality of second recesses 94b is generally oblong in shape. In one aspect of the present disclosure, the first recess 94a is adapted to receive the first projection 64a while the plurality of second recesses 94b is adapted to receive the plurality of second projections 64b in a tight fit or an interference fit.

The cover portion 38 of the enclosure 12 further includes a second hole 96. The second hole 96 is disposed at the first axial end 44 of the cover portion 38 between the first recess 94a and a perimeter 98. In an alternate embodiment depicted in FIG. 7, the second hole 96 of the cover portion 38 is disposed at the first axial end 44 such that the second hole 96 extends through the first recess 94a. The second hole 96 extends through the first and second faces 80, 82. The second hole 96 is adapted to receive a pulling member (e.g., rope, chain, etc.) for pulling the cable pulling assembly 10 through a passage or to receive a hanging member (e.g., nail, hook, etc.) for storing the cable pulling assembly 10 at a location prior to connecting the connectorized end 14 of the fiber optic cable 16 to a fiber optic connection.

Referring now to FIGS. 4-7, the second axial end 42 of the base portion 36 and the second axial end 46 of the cover portion 38 of the body 34 of the enclosure 12 cooperatively define a connector opening 100. The connector opening 100 extends through the first and second surfaces 50, 52 of the base portion 36 and the first and second faces 80, 82 of the cover portion 38. In the open position, the connector opening 100 is completely surrounded by the second axial ends 42, 46 of the base portion 36 and cover portion 38, respectively. In one aspect of the present disclosure, the connector opening 100 includes a width $W_{100}$ that is less than an axial length $L_{100}$ of the connector opening 100.

Referring now to FIGS. 1-7, the installation of the connectorized end 14 into the enclosure 12 will be described. With the body 34 in the open position, the connectorized end 14 is inserted through the connector opening 100. In one aspect of the present disclosure, the width of the connectorized end 14 is greater than the width $W_{100}$ of the connector opening 100. Therefore, in one aspect of the present disclosure, the connectorized end 14 of the fiber optic cable 16 is inserted through the connector opening 100 such that width of the connectorized end 14 is aligned with the axial length $L_{100}$ of the connector opening 100. The connectorized end 14 is then oriented such that the connectorized end 14 will fit in the first and second connector cavities 54, 84 of the base portion 36 and the cover portion 38.

With the connectorized end 14 inserted through the connector opening 100, the enclosure 12 is folded at the living hinge 48 into the closed position (shown in FIGS. 1-3). In the closed position, the cover portion 38 folds over the base portion 36 such that the first face 80 of the cover portion 38 faces toward the first surface 50 of the base portion 36 and the second connector cavity 84 and the plurality of recesses 94 of the cover portion 38 are aligned with the first connector cavity 54 and the plurality of projections 64 of the base portion 36, respectively.

The plurality of projections 64 of the base portion 36 is then inserted into the plurality of recesses 94 of the cover portion 38. In one aspect of the present disclosure, there is an interference fit between the plurality of projections 64 and the plurality of recesses 94. This interference fit maintains the engagement of the base portion 36 with the cover portion 38.

In one aspect of the present disclosure, the perimeter 75 of the base portion 36 is sealed to the perimeter 98 of the cover portion 38. In one aspect of the present disclosure, the perimeter 75 of the base portion 36 is heat sealed to the perimeter 98 of the cover portion 38. In another aspect of the present disclosure, the perimeter 75 of the base portion 36 is sealed to the perimeter 98 of the cover 38 using an adhesive.

In one aspect of the present disclosure, the enclosure 12 of the cable pulling assembly 10 maintains the cleanliness of the connectorized end 14 of the fiber optic cable 16 during cable routing and/or storage. If the fiber optic cable 16 is connectorized in a clean factory environment and the enclosure 12 is mounted over the connectorized end 14 of the fiber optic cable 16 in a clean factory environment, the connector 18 can be connected at a desired telecommunications connection without cleaning an end face of the connector 18 once the enclosure 12 is removed.

Referring now to FIGS. 8 and 9, an alternate embodiment of the enclosure 12 is shown. In this alternate embodiment, the enclosure 12 includes a breakaway portion 110. In one aspect of the present disclosure, the breakaway portion 110 is disposed at the first axial end 44 of the cover portion 38 and extends from the perimeter 98 of the cover portion 38 to the second connector cavity 84. In one aspect of the present disclosure, the breakaway portion 110 extends from the perimeter 98 of the cover portion 38 to the first axial end portion 86 of the second connector cavity 84. A line of weakness 112 bounds the breakaway portion 110. In one aspect of the present disclosure, the line of weakness 112 is formed by perforations. In another aspect of the present disclosure, the line of weakness 112 has a reduced thickness.

The breakaway portion 110 is adapted for selective removal. Upon removal of the breakaway portion 110, a portion of the connectorized end 14 of the fiber optic cable 16 is accessible. The removal of the breakaway portion 110 may also provide a location at which the base portion 36 can be separated from the cover portion 38.

Referring now to FIGS. 1-9, a method of using the cable pulling assembly 10 will be described. With the enclosure 12 disposed around the connectorized end 14 of the fiber optic cable 16, a pulling member (e.g., a string, rope, chain, tie, etc.) is inserted through a hole 114 in the enclosure 12. The hole 114 is cooperatively defined by the first and second holes 78, 96 of the base portion 36 and the cover portion 38, respectively.

The pulling member is then used to pull the fiber optic cable 16 through an enclosed space (e.g., a cable passage, wall, conduit, etc.). In one aspect of the present disclosure, the combined thickness of the base portion 36 and the cover portion 38 is adapted to withstand a tensile force of less than or equal to about 50 lbs applied at the first axial ends 40, 46 of the base portion 36 and cover portion 38.

The tensile force from pulling the cable pulling assembly 10 is applied to the connector 18 as the connector 18 is in a tight fit with the first and second connector cavities 54, 84 of the base and cover portions 36, 38 of the enclosure 12. As the connector 18 is crimped to the strength layer 20 of the fiber optic cable 16, the tensile force applied to the connector 18 through the enclosure 12 is transferred to the strength layer 20, which protects the optical fiber 22 from potential damage.

After the fiber optic cable 16 has been routed to a desired location, the pulling member is removed from the first and second holes 78, 96 of the base portion 36 and cover portion 38. If it is not desirable to make the telecommunication connection at this point, the cable pulling assembly 10 can be stored at a storage location. In one aspect of the present disclosure, the cable pulling assembly 10 hangs from the storage location. In one aspect of the present disclosure, storage location includes a hanging member (e.g., hook, nail, etc.) that can be inserted through the first and second holes 78, 96 such that the cable pulling assembly 10 with the enclosed connectorized end 14 hangs from the hanging member.

When the telecommunications connection is ready to be made, the cable pulling assembly 10 is removed from the hanging member. The base portion 36 and the cover portion 38 of the cable pulling assembly 10 are separated such that the connectorized end 14 can be removed from the cable pulling assembly 10. The connectorized end 14 can then be inserted into the telecommunications connection while the cable pulling assembly 10 is disposed.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A cable pulling assembly comprising:
    an enclosure adapted for enclosing a connector of a fiber optic cable, the enclosure having a body including:
        a base portion having a first axial end and an oppositely disposed second axial end, the base portion defining a first connector cavity that is adapted to receive a portion of the connector of the fiber optic cable; and
        a cover portion having a first axial end and an oppositely disposed second axial end, the second axial end of the cover portion being engaged to the second axial end of the base portion at a hinge which is adjacent to the second axial ends, the cover portion defining a second connector cavity that is adapted to receive a remaining portion of the connector when the enclosure is in a closed position; and
    the enclosure defining a hole that extends through the base and cover portions, wherein the hole is adapted to receive a pulling member.

2. The cable pulling assembly of claim 1, wherein the hinge is a living hinge.

3. The cable pulling assembly of claim 1, wherein the hinge is substantially perpendicular to a longitudinal axis of the enclosure.

4. The cable pulling assembly of claim 1, wherein the enclosure is a blister pack enclosure.

5. The cable pulling assembly of claim 4, wherein the enclosure is manufactured from a plastic material selected from the group consisting of polypropylene, polyethylene and high-density polyethylene.

6. The cable pulling assembly of claim 1, wherein the second axial end of the base portion and the second axial end of the cover portion define a connector opening.

7. The cable pulling assembly of claim 6, wherein the second axial ends of the base and cover portions surround the connector opening when the base and cover portions are in an open position.

8. The cable pulling assembly of claim 1, wherein a first surface of the base portion defines an opening to the first connector cavity and includes a projection disposed at the first axial end of the base portion that extends outwardly from the first surface.

9. The cable pulling assembly of claim 8, wherein a first face of the cover portion defines an opening to the second connector cavity and a recess disposed at the first axial end of the cover portion, the recess being adapted to receive the projection of the base portion when the enclosure is in the closed position.

10. The cable pulling assembly of claim 1, wherein the enclosure is manufactured from a single sheet of material and wherein the base and cover portions are a monolithic piece.

11. A cable pulling assembly comprising:
    an enclosure adapted for enclosing a connector of a fiber optic cable, the enclosure defining a central longitudinal axis and having a body including:
        a base portion having a first axial end and an oppositely disposed second axial end, the base portion defining a first connector cavity that is adapted to receive a portion of the connector of the fiber optic cable; and
        a cover portion having a first axial end and an oppositely disposed second axial end, the second axial end of the cover portion being engaged to the second axial end of the base portion at a living hinge that is substantially perpendicular to the central longitudinal axis and which is adjacent to the second axial ends, the cover portion defining a second connector cavity that is adapted to receive a remaining portion of the connector when the enclosure is in a closed position; and
    the enclosure defining a hole that extends through the base and cover portions, wherein the hole is adapted to receive a pulling member.

12. The cable pulling assembly of claim 11, wherein the enclosure is a blister pack enclosure.

13. The cable pulling assembly of claim 12, wherein the blister pack enclosure is moveable between an open position and a closed position, wherein the base portion includes a first surface and an oppositely disposed second surface, the first surface defining an opening to the first connector cavity, wherein the cover portion includes a first face and an oppositely disposed second face, the first face defining an opening to the second connector cavity, wherein the blister pack enclosure defines a hole that extends through the first axial ends of the base and cover portions, wherein the hole is adapted to receive a pulling member, and wherein the second axial ends of the base and cover portions define a connector opening.

14. The cable pulling assembly of claim 13, wherein the blister pack enclosure is manufactured from a plastic material selected from the group consisting of polypropylene, polyethylene and high-density polyethylene.

15. The cable pulling assembly of claim 13, wherein a first surface of the base portion includes a first projection disposed at the first axial end of the base portion and a plurality of second projections disposed at the second axial end of the base portion, the first and second projections extending outwardly from the first surface.

16. The cable pulling assembly of claim 15, wherein the first face of the cover portion defines a first recess disposed at the first axial end of the cover portion and a plurality of second recesses disposed at the second axial end of the cover portion, the first recess being adapted to receive the first projection of the base portion when the blister pack enclosure is in the closed position and the plurality of second recesses being adapted to receive the plurality of second projections of the base portion when the blister pack enclosure is in the closed position.

17. The cable pulling assembly of claim 16, wherein each of the plurality of second projections and each of the plurality of second recesses are substantially oblong in shape.

18. The cable pulling assembly of claim 12, wherein the enclosure is manufactured from a plastic material selected from the group consisting of polypropylene, polyethylene and high-density polyethylene.

19. The cable pulling assembly of claim 11, wherein the second axial end of the base portion and the second axial end of the cover portion define a connector opening.

20. The cable pulling assembly of claim 11, wherein a first surface of the base portion defines an opening to the first connector cavity and includes a projection disposed at the first axial end of the base portion that extends outwardly from the first surface.

21. The cable pulling assembly of claim 20, wherein a first face of the cover portion defines an opening to the second connector cavity and a recess disposed at the first axial end of the cover portion, the recess being adapted to receive the projection of the base portion when the enclosure is in the closed position.

22. The cable pulling assembly of claim 11, wherein the enclosure is manufactured from a single sheet of material and wherein the base and cover portions are a monolithic piece.

23. A cable pulling assembly comprising:
 an enclosure adapted for at least partially enclosing a connector of a fiber optic cable, the enclosure having a body including:
  a base portion having a first axial end and an oppositely disposed second axial end, the base portion defining a first connector cavity that is adapted to receive a portion of the connector of the fiber optic cable; and
  a cover portion having a first axial end and an oppositely disposed second axial end, the second axial end of the cover portion being engaged to the second axial end of the base portion at a hinge, the cover portion defining a second connector cavity that is adapted to receive a remaining portion of the connector when the enclosure is in a closed position;
 wherein the second axial end of the base portion and the second axial end of the cover portion define a connector opening;
 wherein the second axial ends of the base and cover portions surround the connector opening when the base and cover portions are in an open position;
 wherein the enclosure defines a hole that extends through the base and cover portions; and
 wherein the hole is adapted to receive a pulling member.

24. The cable pulling assembly of claim 23, wherein the connector opening is adjacent the hinge.

25. The cable pulling assembly of claim 23, wherein a pair of hinging elements of the hinge are positioned on opposite sides of the connector opening.

26. The cable pulling assembly of claim 23, wherein the connector opening is adapted to receive a portion of the fiber optic cable.

27. The cable pulling assembly of claim 23, wherein the connector opening is adapted to allow the connector of the fiber optic cable to pass through the connector opening when the base and cover portions are in the open position.

28. The cable pulling assembly of claim 23, wherein the enclosure is manufactured from a single sheet of material and wherein the base and cover portions are a monolithic piece.

\* \* \* \* \*